Jan. 12, 1965   C. H. BAKER   3,165,172
SEAL FOR PISTON AND CYLINDER DEVICES
Filed May 25, 1962

INVENTOR.
CHARLES H. BAKER
BY
Oberlin, Maky & Donnelly
ATTORNEYS

United States Patent Office 3,165,172
Patented Jan. 12, 1965

3,165,172
SEAL FOR PISTON AND CYLINDER DEVICES
Charles H. Baker, Cleveland, Ohio, assignor to Cleveland Pneumatic Industries, Inc., Cleveland, Ohio, a corporation of Ohio
Filed May 25, 1962, Ser. No. 197,757
5 Claims. (Cl. 184—6)

This invention relates in general to seals and more particularly to seals employed in conjunction with cylinder and piston assemblies for preventing leakage of the fluid from one area in the cylinder into another area in the cylinder.

In the past, various means have been provided to prevent the above noted, undesirable leakage. One such means has been in the form of metallic piston rings which are mounted in annular grooves in the piston, the outer periphery of the rings contacting the cylinder wall. Another means has been in the form of O-rings provided in similar annular grooves. Yet another means is in the form of packing provided in annular grooves in the piston, the packing contacting the cylinder wall. In all of the above described sealing arrangements, a common undesirable feature has been the relatively high degree of friction between the sealing means and the cylinder wall. Such friction, as will be readily understood, reduces the efficiency of the device employed.

It is therefore a primary object of this invention to provide a seal for sealing a reciprocating member during reciprocal movement thereof in a cylinder wherein the friction resulting from such reciprocal movement is greatly reduced.

Another object of the invention is to provide a seal for use in the indicated environment wherein such seal provides lubrication for the cylinder wall and the reciprocating member reciprocable therein.

Yet another object of the invention is to provide a seal which lubricates the cylinder wall and reciprocating member when a non-lubricating type working fluid is present in the cylinder.

These and other more specific objects will become more apparent from the following specification and drawing, wherein.

Figure 1:
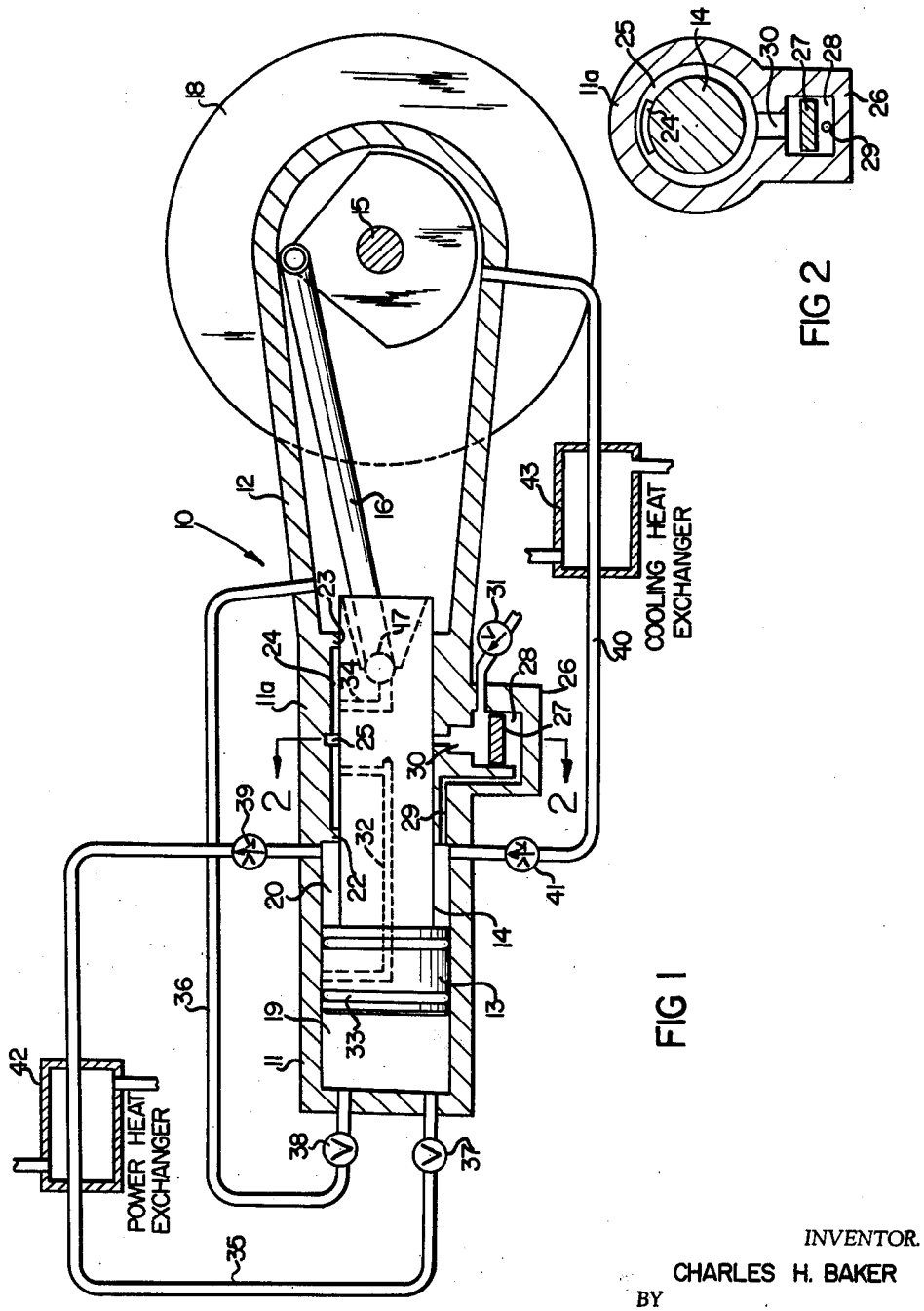
FIG. 1 is a side elevational view, partially in section and partially schematic, of a fluid engine having incorporated therein the novel seal of the invention.

Referring now to the drawings, wherein like reference characters are used to designate like parts, and particularly to FIG. 1, which is partially schematic, the fluid engine is generally designated at 10 and comprises a cylinder 11, a cylinder extension 11a, and a crankcase 12 extending from the extension 11a. Reciprocably disposed in cylinder 11 is a piston 13 at one end of a piston rod 14 which extends in the direction of the crankcase 12. A suitably journalled shaft 15 is enclosed by the crankcase 12 and has a crank arm to which a connecting rod 16 is pivotally connected. Such connecting rod is pivotally connected at its other end to the piston rod 14, such connection in the form shown being a ball joint connection 17. To accommodate the movement of connecting rod 16, the end of the piston rod 14 is provided with an outwardly enlarged opening as can be seen in FIG. 1. A flywheel 18 is secured to the crankshaft 15 exteriorly of the crankcase 12.

The piston defines two chambers 19 and 20 within the cylinder 11 at the respective sides of the piston and a liquid seal is provided to isolate this working portion of the cylinder comprising said chambers from direct communication with the crankcase 12.

Figure 2:
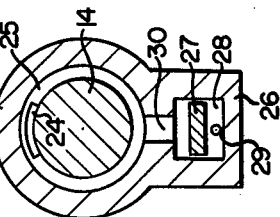
FIG. 2 is a sectional view taken on line 2—2 of FIG. 1.

Referring to FIGS. 1 and 2, the liquid seal comprises inwardly directed annular bearing surfaces including a pair of spaced, arcuate sections 22 and 23, each of said bearing surfaces defining an opening slightly greater in diameter than the exterior diameter of the piston rod 14, whereby the bearing surfaces guide, but do not unduly frictionally resist, the reciprocal movement of the piston rod 14. The arcuate bearing sections 22 and 23 define therebetween, in conjunction with the exterior surface of piston rod 14, a longitudinally or axially extending, lubricant-containing chamber or recess 24. The cylinder extension 11a is further provided with an annular groove 25 intermediate the arcuate bearing sections 22 and 23, said annular groove 25 containing lubricating fluid for lubricating piston rod 14 as well as functioning to enhance the flow of lubricating fluid into chamber 24, as will be more clearly pointed out hereinbelow.

An auxiliary cylinder or housing 26 is secured to the cylinder extension 11a and extends outwardly therefrom, said cylinder 26 providing a means whereby pressure can be applied to lubricating fluid in the chamber or recess 24. A piston 27 is positioned in the cylinder or housing 26 for vertical movement therein. The chamber 28 below piston 25 communicates with the fluid under pressure in the chamber 20 of cylinder 11 through a preferably circular passage 29, which extends through a side wall of the cylinder 26 and through the wall of the cylinder extension 11a. Under conditions to be described in more detail hereinbelow, fluid under pressure in chamber 20 passes through passage 29 thereby exerting a pressure on the bottom of piston 25 which in turn compresses the lubricating fluid contained thereabove.

An enlarged opening 30 is provided in the cylinder extension 11a above the piston 27, the upper end of the opening communicating with the annular groove 25 and the lower end of the opening communicating with the area above piston 27.

The lubricating fluid contained in chamber 24, groove 25, opening 30, and that part of the cylinder 26 above the piston 27 can be of any suitable type providing the necessary metal lubricating qualities. The oil is preferably supplied to the housing under pressure through a check valve 31, the check valve preventing back flow of the oil to the supply source when the pressure in chamber 24 becomes elevated. The oil is supplied to the housing under pressure, a conventional pump being preferably employed for such purpose.

The piston rod and piston are provided with an opening or passage 32 which extends from the periphery of the piston 13 to the periphery of the piston rod 14 as clearly shown in FIG. 1, whereby communication with the lubricating chamber 24 is provided, the lubricating oil thus flowing therefrom to the periphery of the piston. Suitable rings such as, e.g., piston rings 33, are employed in a conventional manner. A further opening or passage 34 is provided in the piston rod 14 for maintaining pressure on the ball joint connection.

The cylinder 11 is schematically shown in FIG. 1 as being provided with a plurality of openings in the walls thereof, each of said openings have fluid conduits mounted therein, said conduits having regulating valves positioned therein for the purpose of regulating fluid flow therethrough. It should be kept in mind that FIG. 1 is merely a schematic view and in the actual engine construction the flow regulating valves are preferably, where possible, mounted within the cylinder walls.

Conduits 35 and 36 communicate with chamber 19 through the end wall of cylinder 11, valves 37 and 38 being interposed in lines 35 and 36, respectively, to regulate the flow of fluid to and from chamber 19. Valves 37 and 38 are suitably operatively connected to the crankshaft 15 to be opened and closed at proper related points in the cycle. The opposite end of conduit 35 communicates with chamber 20. A check valve 39 is provided relatively adjacent this end for fixing the direction of fluid flow therethrough.

Cylinder 11 is further provided with a conduit 40 which communicates with chamber 20 at one end and with crankcase chamber 12 at its other end, conduit 40 being provided with a check valve 41 interposed therein for the purpose of allowing fluid flow from line 40 into chamber 20 under conditions to be described in more detail hereinbelow.

An appropriate power heat exchanger 42 is interposed in line 35 and is adapted to raise the temperature of fluid flowing therethrough. In conventional manner, the heat exchanger 42 is provided with an inlet and an outlet for the purpose of conveying a suitable heating media through said heat exchanger for heat exchange with the fluid flowing through line 35 within the heat exchanger.

A cooling heat exchanger 43 is interposed in line 40 and is adapted to cool the fluid flowing therethrough. The cooling heat exchanger 43, similarly to power heat exchanger 42, is shown in FIG. 1 in diagrammatic form, the specific structure thereof forming no part of the instant invention. The cooling heat exchanger 43 is conventionally provided with inlet and outlet ports which provide for flow of cooling fluid therethrough.

As shown in FIG. 1, conduit 36 communicates with the interior of the crankcase chamber 12 through an opening in the crankcase wall. Thus, when valve 38 is opened in timed sequence by revolution of the crankshaft 15, fluid is adapted to flow from chamber 19 to the interior of the crankcase chamber 12, which is at a relatively lower pressure. Similarly, when valve 37 is opened in timed sequence by the crankshaft rotation, fluid flows from chamber 20 through check valve 39, conduit 35 and heat exchanger 42 into chamber 19.

The operational cycle of the fluid engine of the invention will now be described with particular attention being drawn to the liquid seal. In this regard it should be noted that the structure and operation of the fluid engine, and more specifically the means for pressurizing the crankcase 12, are more specifically described and claimed in U.S. application Serial No. 191,075 filed April 30, 1962 in the name of the instant inventor and assigned to the assignee of the present invention. The operational cycle therefore will be described only to the extent necessary for a complete understanding of the present invention. At the beginning of the power stroke, valve 37 is opened, fluid at high temperature and pressure flowing therethrough from line 35 into chamber 19 and acting against the working face of piston 13. As piston 13 travels to the right as viewed in FIG. 1 under the pressure of the working fluid, the fluid in chamber 20 becomes compressed. In this regard it should be noted that the engine is a closed system and conduit 35 is filled with working fluid at all times. As the fluid in chamber 20 is compressed by the piston 13 it will reach a predetermined elevated pressure sufficient to open the check valve 39 thereby enabling the pressurized fluid to flow therethrough into line 35. The fluid preferably used in the engine in the form shown is Freon although it will be apparent that any suitable fluid could be employed.

Subsequent to the compression of the working fluid in chamber 20 to the desired pressure, the fluid flows through the power heat exchanger 42 where the fluid takes on heat but remains at essentially a constant pressure. As the fluid enters chamber 19 and acts against the working surface of the piston 13 thereby performing work, the fluid expands thereby decreasing in pressure. Although the pressure in chamber 20 equals or exceeds the pressure in chamber 19 during a certain portion of the power stroke, the significantly greater area of the working surface of the piston 13 in the chamber 19 in comparison to the area of the piston 13 in chamber 20 enables the force therein to move the piston to the right, as will be readily apparent.

During normal operation of the fluid engine, the valve 37 does not remain open during the entire power stroke, the power stroke, of course, occupying 180° of the crankshaft rotation. Rather, the valve 37 is closed or cut off at approximately 120° rotation of the crankshaft subsequent to the opening of the valve 37. Thus, near the end of the power stroke, the working fluid expands thereby resulting in a reduction of pressure. As will be apparent, the expansion of the working fluid is accompanied by a reduction in temperature thereof.

Referring now to the operation of the liquid seal, during the power stroke of piston 13 a minor portion of the compressed fluid in chamber 20 is forced through passage 29 into cylinder or housing 26, contacting the bottom of piston 27. The fluid will pass through passage 29 only to the extent necessary to raise the piston 27 sufficiently to compress the lubricating fluid contained in the opening 30, groove 25 and chamber 24 to an extent wherein such pressure is equal or substantially equal to the pressure of the fluid in chamber 20. It will thus be noted that the pressure increase on the lubricant in the liquid seal will increase proportionally to the increase in pressure on the working fluid in chamber 20. Due to such attained equal pressures, there is no tendency of the working fluid to flow past the annular bearing surface 22 into the liquid seal. Further, as will be further explained hereinbelow, the difference in pressure at any time between the crankcase 12 and the lubricating fluid in the liquid seal is not so great as to enable lubricating fluid in the liquid seal to flow therefrom into the crankcase 12 and intermix therein with the working fluid, or vice versa. Although pressure differences do exist, the viscosity of the lubricating fluid prevents such flow.

As the piston 13 reaches its bottom dead center position, the valve 38, which, as set forth above, is operatively connected to the crankshaft 15 is opened, thereby allowing fluid flow through line 36 to the interior of the crankcase 12, the latter being at a relatively lower pressure. The fluid flow into the crankcase chamber 12 significantly raises the pressure therein.

When the piston is in its bottom dead center position, the return stroke thereof is initiated by the inertia of the crankshaft 15 and the flywheel 18. As this inertia moves the piston 13 on its return stroke, chamber 20 will expand and become an area of relatively low pressure. When the pressure in chamber 20 becomes less than the pressure of the fluid in the crankcase chamber, the fluid will flow from the latter to the former through conduit 40. The fluid flowing through conduit 40 to chamber 20 passes through cooling heat exchanger 43 whereby the temperature of said fluid is reduced. The heat exchanger 43, and particularly the cooling fluid employed therein, is selected to cool the working fluid flowing therethrough to the extent necessary to achieve optimum efficiency in the engine. The working fluid in chamber 20 will thus be at relatively low pressure and temperature.

As the pressure in chamber 20 decreases as the piston moves toward its top dead center position, the pressure on the bottom of piston 27 in the housing 26 will correspondingly and proportionally decrease. Accordingly, the lubricating oil in the liquid seal, still under a relatively high pressure, will force piston 27 downwardly whereby the lubricating oil in chamber 24, groove 25 and opening 30 expands thereby lowering the pressure therein. Piston 27 will move downwardly until the resulting pressure in chamber 24, groove 25 and opening 28 corresponds to the pressure in the chamber 20. There is thus no tendency for the lubricating fluid to flow into chamber 20 past the bearing surface 22. Further, the pressure difference existing at any time between the crankcase 12 and the lubricating fluid in the liquid seal is not sufficient to allow lubricating fluid to flow into crankcase 12, or, to allow working fluid in crankcase 12 to flow past the bearing surface 23 into chamber 24.

It will thus be seen that there has been provided a novel sealing means which significantly reduces the degree of friction between the cylinder wall and the piston rod reciprocable therein. Further, the novel sealing means of my invention encloses a source of lubricating fluid to provide lubrication for the cylinder wall and the piston rod reciprocable therein. By reducing the friction during operation and lubricating the cylinder wall and piston rod in the described manner, the efficiency of the engine is significantly improved.

Although in the form shown my novel seal means is used to seal and lubricate a piston rod reciprocable within a cylinder, I do not intend to be limited to this specific structure. It should be apparent to those skilled in the art that my novel seal could be employed equally satisfactorily with, e.g., a piston, the seal in such an environment serving to seal from each other the cylinder chambers bounded by the opposite ends of the piston, as well as reducing the sliding friction during reciprocation of the piston in the cylinder and providing lubrication. Similarly, although in the form shown and described I have shown my novel sealing means used in a fluid engine, it should be readily apparent that the seal could be effectively employed in other environments.

Other modes of applying the principle of the invention may be employed, change being made as regards the details described, provided the features stated in any of the following claims or the equivalent of such be employed.

I, therefore, particularly point out and distinctly claim as my invention:

1. A combination comprising cylinder means, piston means comprising a piston and a piston rod connected thereto reciprocable within said cylinder, with a portion of said piston and said cylinder means defining a chamber in which working fluid is compressed by reciprocation of the piston, a bearing surface being provided in the cylinder means for support and guiding engagement of said piston rod, said bearing surface having a longitudinally enlarged lubricant-containing recess, means for applying pressure to the lubricant in said recess proportional to the pressure applied to the working fluid during compression of the latter, and passage means affording communication from said lubricant-containing recess to an area on the periphery of said piston.

2. A combination comprising cylinder means, piston means reciprocable within said cylinder means, with a portion of said piston means and said cylinder means defining a chamber in which working fluid is compressed by reciprocation of the piston means, a connecting rod pivotally connected to said piston rod, a bearing surface being provided in said cylinder means for support and guiding engagement with the piston means, said bearing surface having a lubricant-containing recess, means for applying pressure to the lubricant in said recess proportional to the pressure applied to the working fluid during compression of the latter, and passage means communicating said lubricant-containing recess with said pivotal connection.

3. A combination comprising cylinder means, piston means comprising a piston and a piston rod connected thereto reciprocable within said cylinder means, with a portion of said piston means and said cylinder means defining a chamber in which working fluid is compressed by reciprocation of the piston means, a connecting rod pivotally connected to said piston rod, a bearing surface being provided in said cylinder means for support and guiding engagement with the piston means, said bearing surface having a lubricant-containing recess, means for applying pressure to the lubricant in said recess proportional to the pressure applied to the working fluid during compression of the latter, and passage means connecting said lubricant-containing recess with the periphery of said piston and with said pivotal connection.

4. A combination comprising a cylinder, a cylinder extension, piston means reciprocable within said cylinder and said cylinder extension, said piston means and said cylinder defining a chamber in which working fluid is compressed by reciprocation of the piston means, said cylinder extension having a pair of arcuate bearing sections which define with said piston means a longitudinally extending lubricant-containing recess, said cylinder extension being formed with an annular groove intermediate said arcuate bearing sections, one portion of said groove communicating with said recess, and another portion of said groove communicating with an enlarged opening in said cylinder extension communicable with a lubricant supply source, and means for applying to the lubricant in said opening, groove and recess pressure proportional and in direct response to the pressure of the working fluid in said chamber.

5. The combination of claim 4 wherein said means for applying pressure to said lubricant in said recess comprises an auxiliary cylinder secured to said cylinder extension, a piston reciprocable within said auxiliary cylinder, one face of said piston communicating with said enlarged opening, the opposite face of said piston communicating with passage means formed in said cylinder extension and opening into said chamber whereby working fluid from said chamber enters said auxiliary cylinder through said passage means against said opposite face of said piston thereby raising the pressure of said lubricant to a level substantially equal to the pressure of said working fluid.

References Cited in the file of this patent

UNITED STATES PATENTS

| | | |
|---|---|---|
| 491,224 | Poore | Feb. 7, 1893 |
| 1,000,791 | Erikson | Aug. 15, 1911 |
| 1,546,596 | Mader | July 21, 1925 |
| 1,603,173 | Watts | Oct. 12, 1926 |
| 2,983,334 | Dalrymple | May 9, 1961 |